United States Patent
Melnikov

(10) Patent No.: US 12,292,747 B2
(45) Date of Patent: May 6, 2025

(54) METHOD FOR OPERATING A ROBOTIC VEHICLE

(71) Applicant: YANDEX SELF DRIVING GROUP LLC, Moscow (RU)

(72) Inventor: Ilya Alekseevich Melnikov, Reutov (RU)

(73) Assignee: Y.E. Hub Armenia LLC, Yerevan (AM)

( * ) Notice: Subject to any disclaimer, the term of this patent is extended or adjusted under 35 U.S.C. 154(b) by 275 days.

(21) Appl. No.: 17/944,722

(22) Filed: Sep. 14, 2022

(65) Prior Publication Data
US 2023/0085147 A1 Mar. 16, 2023

(30) Foreign Application Priority Data
Sep. 14, 2021 (RU) .......................... RU2021127052

(51) Int. Cl.
*G05D 1/246* (2024.01)
*B60W 60/00* (2020.01)
(Continued)

(52) U.S. Cl.
CPC ....... *G05D 1/2464* (2024.01); *B60W 60/0011* (2020.02); *B60W 60/0027* (2020.02);
(Continued)

(58) Field of Classification Search
CPC .... G05D 1/2464; G05D 1/0214; G05D 1/617; G05D 1/622; G05D 1/633;
(Continued)

(56) References Cited

U.S. PATENT DOCUMENTS 10,338,591 B2 * 7/2019 Baalke ................. G05D 1/0088
10,569,773 B2 * 2/2020 Zhao ..................... G06V 20/58
(Continued)

FOREIGN PATENT DOCUMENTS

CN 108628298 A * 10/2018 ........ B60W 30/0953
JP 2016068704 A 5/2016
(Continued)

OTHER PUBLICATIONS

Translation of CN-108628298-A, 16 pages (Year: 2018).*
(Continued)

*Primary Examiner* — Dale W Hilgendorf
(74) *Attorney, Agent, or Firm* — BCF LLP

(57) ABSTRACT

A method of operating a robotic vehicle is provided. The method includes generating, using a prediction model, first scores, each of the first scores associated with a possible action of the robotic vehicle. The prediction model generates the first scores based, at least in part, on a predicted probability of the robotic vehicle encountering a dynamic object. The method further includes generating, using an analytical model, second scores, each of the second scores associated with a possible action of the robotic vehicle. The analytical model generates the second scores based, at least in part, on the information on the static objects. The method also includes combining the first scores with the second scores to generate combined scores, and selecting an action for the robotic vehicle based, at least in part, on the combined scores. A motion planning module and a robotic vehicle implementing the method are also disclosed.

18 Claims, 10 Drawing Sheets

(51) Int. Cl.
  *G05D 1/00* (2024.01)
  *G05D 1/617* (2024.01)
  *G05D 1/622* (2024.01)
  *G05D 1/633* (2024.01)
  *G06V 20/56* (2022.01)
  *G06V 20/58* (2022.01)

(52) U.S. Cl.
  CPC ..... *B60W 60/00274* (2020.02); *G05D 1/0214* (2013.01); *G05D 1/617* (2024.01); *G05D 1/622* (2024.01); *G05D 1/633* (2024.01); *G06V 20/56* (2022.01); *G06V 20/58* (2022.01)

(58) Field of Classification Search
  CPC ........ B60W 60/0011; B60W 60/0027; B60W 60/00274; G06V 20/56; G06V 20/58
  See application file for complete search history.

(56) References Cited

U.S. PATENT DOCUMENTS

| | | | | |
|---|---|---|---|---|
| 10,730,531 | B1* | 8/2020 | Phillips | G06N 20/00 |
| 11,016,491 | B1* | 5/2021 | Millard | G06N 3/045 |
| 11,465,633 | B2* | 10/2022 | Mohajerin | B60W 60/001 |
| 11,498,587 | B1* | 11/2022 | Mitlin | G05D 1/0214 |
| 11,731,274 | B2* | 8/2023 | Hong | B25J 9/1651 |
| | | | | 700/245 |
| 11,827,214 | B2* | 11/2023 | Amirloo Abolfathi | |
| | | | | B60W 60/00276 |
| 2015/0379408 | A1* | 12/2015 | Kapoor | G01W 1/10 |
| | | | | 706/46 |
| 2019/0025841 | A1* | 1/2019 | Haynes | B60W 30/00 |
| 2019/0367021 | A1* | 12/2019 | Zhao | G08G 1/161 |
| 2020/0148215 | A1* | 5/2020 | Mohajerin | G06N 3/045 |
| 2021/0276598 | A1* | 9/2021 | Amirloo Abolfathi | |
| | | | | B60W 30/09 |
| 2022/0036579 | A1* | 2/2022 | Liang | G06T 7/70 |
| 2022/0153310 | A1* | 5/2022 | Yang | G05D 1/0221 |
| 2022/0269279 | A1* | 8/2022 | Redford | G06N 3/02 |
| 2022/0277165 | A1* | 9/2022 | Zhu | G06V 20/597 |
| 2022/0305657 | A1* | 9/2022 | Hong | G05D 1/0223 |
| 2022/0355821 | A1* | 11/2022 | Ling | B60W 60/0015 |
| 2022/0388532 | A1* | 12/2022 | Yangel | B60W 60/001 |
| 2023/0041975 | A1* | 2/2023 | Caldwell | B60W 60/0027 |
| 2023/0176575 | A1 | 6/2023 | Letwin et al. | |

FOREIGN PATENT DOCUMENTS

| | | |
|---|---|---|
| WO | 2013046300 A1 | 4/2013 |
| WO | 2017069740 A1 | 4/2017 |
| WO | 2019231456 A1 | 12/2019 |

OTHER PUBLICATIONS

Johann et al., "Dynamic Lambda-Field: A Counterpart of the Bayesian Occupancy Grid for Risk Assessment in Dynamic Environments", Published on Mar. 8, 2021, Cornell University Library 201 Olin Library Cornell University Ithaca, New York, 14853.

Cai et al. "Risk-Aware Path Planning Under Uncertainty in Dynamic Environments", Published online on Feb. 17, 2021, Journal of Intelligent & Robotic Systems, vol. 101, No. 3, https://doi.org/10.1007/s10846-021-01323-3.

European Search Report dated Jan. 27, 2023 issued in respect of the European Patent Application No. 22195745.9.

Adarsh Sathyamoorthy et al.,"Frozone: Freezing-Free, Pedestrian-Friendly Navigation in Human Crowds", Published on Mar. 11, 2020.

Jiachen Li et al.,"Conditional Generative Neural System for Probabilistic Trajectory Prediction", Published on Jul. 28, 2019.

Adarsh Sathyamoorthy et al.,"DenseCAvoid: Real-time Navigation in Dense Crowds using Anticipatory Behaviors", Published on Feb. 7, 2020.

Chen et al.,"Crowd-Robot Interaction: Crowd-aware Robot Navigation with Attention-based Deep Reinforcement", Published on Feb. 19, 2019.

Russian Search Report dated Sep. 21, 2023 issued in respect of the counterpart Russian Patent Application No. RU 2021127052.

Hasselt, "Double Q-learning", Published in Jan. 2010, https://www.researchgate.net/publication/221619239_Double_Q-learning.

Watkins et al., "Q-Learning", 1992 Kluwer Academic Publishers, Boston. Manufactured in The Netherlands, Published in May 1992, Machine Learning 8(3-4):279-292, DOI:10.1007/BF00992698.

Berg et al., "Reciprocal n-Body Collision Avoidance", Published in Apr. 2011, Chapter in Springer Tracts in Advanced Robotics, DOI: 10.1007/978-3-642-19457-3_1.

\* cited by examiner

METHOD FOR OPERATING A ROBOTIC VEHICLE

CROSS-REFERENCE

The present application claims priority to Russian Patent Application No. 2021127052, entitled "Method for Operating a Robotic Vehicle", filed Sep. 14, 2021, the entirety of which is incorporated herein by reference.

FIELD OF TECHNOLOGY

The present technology relates to computer-implemented methods and systems for operating a robotic vehicle, and more specifically, to methods and systems for navigating a robotic vehicle in settings that include both static and dynamic objects.

BACKGROUND

Autonomous robotic vehicles are vehicles that are able to autonomously navigate through private and/or public spaces. Using a system of sensors that detect the location and/or surroundings of the vehicle, logic within or associated with the vehicle controls the velocity and direction of the robotic vehicle based on the sensor-detected location and surroundings of the vehicle.

A variety of sensor systems may be used by the robotic vehicle, such as but not limited to camera systems, radar systems, and LIDAR systems. Different sensor systems may be employed for capturing different information, and/or in different format, about the location and the surroundings of the vehicle. For example, LIDAR systems may be used to capture point cloud data for building 3D map representations of the surroundings and other potential objects located in proximity to the robotic vehicle.

Such autonomous robotic vehicles are being used for a wide variety of applications, including delivering packages and other items. These applications may require the robotic vehicle to navigate through dynamic environments, such as on crowded sidewalks, in crosswalks where there may be human and vehicular traffic, and so on. In performing this navigation task, an autonomous robotic vehicle needs to avoid collisions with dynamic objects, such as people and moving vehicles, and with static objects, such as parked vehicles, buildings, lamp posts, and other common non-moving objects that may be found within the urban and suburban environments in which the robotic vehicle is expected to operate.

SUMMARY

Implementations of the disclosed technology use a motion planning module with two separate models to plan the motion of a robotic vehicle. A first model, referred to as a "prediction" model, considers the movement of dynamic objects, such as pedestrians or vehicles. Because people and other dynamic objects may move from one point to another and rapidly alter their position, speed, and direction, it is difficult to predict their position a few seconds ahead. Therefore, the prediction model generates scores for possible actions based on approximate probabilities of the robotic vehicle encountering a dynamic object if the possible action is taken. This will depend on predictions of the positions and directions of the dynamic objects. A second model, referred to as an "analytical" model, generates scores based on the positions of static objects, such as buildings. Because the positions of such static objects do not change, the analytical model can make highly accurate determinations of whether a particular action will bring the robotic vehicle into close proximity or even into a collision with a static object. The scores generated by the prediction model may be combined with the scores generated by the analytical model to determine an action for the robotic vehicle.

By separating the models for dynamic and static objects, a motion planning module according to the disclosed technology is able to use models that are better suited than any single model for each of these types of objects. For example, a pretrained artificial neural network may be used to generate the scores in the prediction model, while more accurate methods, such as well-known collision detection algorithms, may be used to generate the scores in the analytical model. Additionally, when the scores are combined, separating the models permits varying weights to be used to emphasize avoidance of one type of object over the other. For example, if the robotic vehicle collides with a pedestrian (a dynamic object), there may be injury, whereas a collision with a building (a static object) is more likely to cause only property damage. Taking this into account, the scores from the prediction model may be given a higher weight than the scores from the analytical model, to place a greater emphasis on avoiding encounters with dynamic objects. Thus, by using motion planning based on separate models for handling dynamic and static objects, the performance of the robotic vehicle and its ability to navigate in potentially crowded areas are improved.

In accordance with one aspect of the present disclosure, the technology is implemented in a method of operating a robotic vehicle. The method includes receiving, on a computing device associated with the robotic vehicle, a sensor input from a sensor associated with the robotic vehicle, the sensor input providing information on dynamic objects and static objects in a vicinity of the robotic vehicle. The method further includes generating, using a prediction model on the computing device, a first plurality of scores, each score in the first plurality of scores associated with a possible action of the robotic vehicle from a first plurality of actions. The prediction model is configured to generate the first plurality of scores based, at least in part, on a predicted probability of the robotic vehicle encountering any of the dynamic objects. The method further includes generating, using an analytical model on the computing device, a second plurality of scores, each score in the second plurality of scores associated with a possible action of the robotic vehicle from the second plurality of actions. The analytical model is configured to generate the second plurality of scores based, at least in part, on the information on the static objects. The method also includes combining the first plurality of scores with the second plurality of scores to generate a plurality of combined scores, selecting an action for the robotic vehicle based, at least in part, on the plurality of combined scores, and operating the robotic vehicle according to the selected action.

In some implementations, the prediction model is configured to generate the first plurality of scores based, at least in part, on predicted actions of each of the dynamic objects. In some implementations, the analytical model is more accurate than the prediction model. In some implementations combining the first plurality of scores with the second plurality of scores includes giving more weight to the first plurality of scores than to the second plurality of scores, to avoid collisions with the dynamic objects.

In some implementations, selecting the action for the robotic vehicle further includes selecting the action based, at least in part, on a target destination for the robotic vehicle. In some implementations, each action of the first plurality of actions includes an angular direction and a velocity for the robotic vehicle. In some of these implementations, the first plurality of scores is represented in a two-dimensional matrix, wherein a first dimension of the two-dimensional matrix represents the angular direction and a second dimension of the two-dimensional matrix represents the velocity.

In some implementations, the prediction model includes a pretrained neural network, and generating the first plurality of scores includes providing at least part of the information on the dynamic objects as input to the pretrained neural network. In some implementations, generating the second plurality of scores includes penalizing actions that are obstructed by a static object.

In accordance with other aspects of the present disclosure, a motion planning module for a robotic vehicle is provided. The motion planning module includes a processor and a memory. The memory stores programmed instructions that when executed by the processor cause the processor to: receive a sensor input from a sensor associated with the robotic vehicle, the sensor input providing information on dynamic objects and static objects in a vicinity of the robotic vehicle; generate, using a prediction model, a first plurality of scores, each score in the first plurality of scores associated with a possible action of the robotic vehicle from a first plurality of actions, the prediction model configured to generate the first plurality of scores based, at least in part, on a predicted probability of the robotic vehicle encountering any of the dynamic objects; generate, using an analytical model, a second plurality of scores, each score in the second plurality of scores associated with a possible action of the robotic vehicle from the second plurality of actions, the analytical model configured to generate the second plurality of scores based, at least in part, on the information on the static objects; combine the first plurality of scores with the second plurality of scores to generate a plurality of combined scores; and select an action for the robotic vehicle based, at least in part, on the plurality of combined scores.

In some implementations of this aspect, the prediction model is configured to generate the first plurality of scores based, at least in part, on predicted actions of each of the dynamic objects. In some implementations, the analytical model is more accurate than the prediction model. In some implementations, the memory stores programmed instructions that when executed by the processor cause the processor to give more weight to the first plurality of scores than to the second plurality of scores when combining the first plurality of scores with the second plurality of scores, to avoid collisions with the dynamic objects.

In some implementations, the memory stores programmed instructions that when executed by the processor cause the processor to select the action based, at least in part, on a target destination for the robotic vehicle. In some implementations, each action of the first plurality of actions includes an angular direction and a velocity for the robotic vehicle.

In some implementations, the prediction model includes a pretrained neural network, and generating the first plurality of scores includes providing at least part of the information on the dynamic objects as input to the pretrained neural network. In some implementations, the memory stores programmed instructions that when executed by the processor cause the processor to generate scores in the second plurality of scores that penalize actions that are obstructed by a static object.

In accordance with a further aspect of the present disclosure, the technology is implemented in a robotic vehicle. The robotic vehicle includes at least one sensor, and a computing device including a motion planning module. The motion planning module is configured to: receive a sensor input from the at least one sensor, the sensor input providing information on dynamic objects and static objects in a vicinity of the robotic vehicle; generate, using a prediction model, a first plurality of scores, each score in the first plurality of scores associated with a possible action of the robotic vehicle from a first plurality of actions, the prediction model configured to generate the first plurality of scores based, at least in part, on a predicted probability of the robotic vehicle encountering any of the dynamic objects; generate, using an analytical model, a second plurality of scores, each score in the second plurality of scores associated with a possible action of the robotic vehicle from a second plurality of actions, the analytical model configured to generate the second plurality of scores based, at least in part, on the information on the static objects; combine the first plurality of scores with the second plurality of scores to generate a plurality of combined scores; and select an action for the robotic vehicle based, at least in part, on the plurality of combined scores. The computing device further includes an operation module configured to cause the robotic vehicle to operate according to the selected action from the planning module.

In some implementations, the prediction model is configured to generate the first plurality of scores based, at least in part, on predicted actions of each of the dynamic objects. In some implementations, the prediction model comprises a pretrained neural network.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
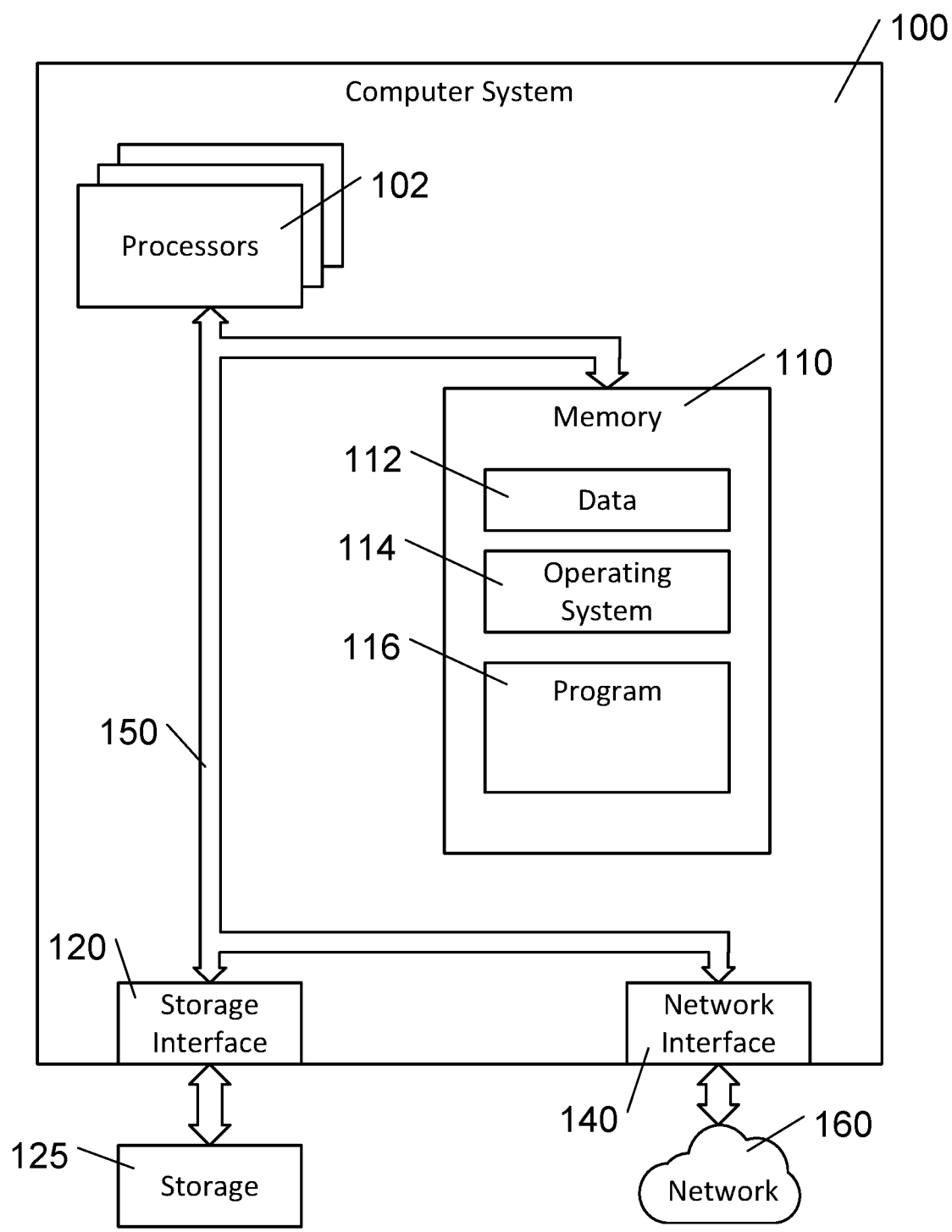
FIG. 1 depicts a schematic diagram of an example computer system for use in some implementations of systems and/or methods of the present technology.

Various representative implementations of the disclosed technology will be described more fully hereinafter with reference to the accompanying drawings. The present technology may, however, be implemented in many different forms and should not be construed as limited to the representative implementations set forth herein. In the drawings, the sizes and relative sizes of layers and regions may be exaggerated for clarity. Like numerals refer to like elements throughout.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. By contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative implementations and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The functions of the various elements shown in the figures, including any functional block labeled as a "processor," may be provided through the use of dedicated hardware as well as hardware capable of executing software. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, an application-specific integrated circuit (ASIC), a field-programmable gate array (FPGA), a read-only memory (ROM) for storing software, a random-access memory (RAM), and non-volatile storage. Other hardware, conventional and/or custom, may also be included.

Software modules, or simply modules or units which are implied to be software, may be represented herein as any combination of flowchart elements or other elements indicating the performance of process steps and/or textual description. Such modules may be executed by hardware that is expressly or implicitly shown. Moreover, it should be understood that a module may include, for example, but without limitation, computer program logic, computer program instructions, software, stack, firmware, hardware circuitry, or a combination thereof, which provides the required capabilities.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

The present technology may be implemented as a system, a method, and/or a computer program product. The computer program product may include a computer-readable storage medium (or media) storing computer-readable program instructions that, when executed by a processor, cause the processor to carry out aspects of the disclosed technology. The computer-readable storage medium may be, for example, an electronic storage device, a magnetic storage device, an optical storage device, an electromagnetic storage device, a semiconductor storage device, or any suitable combination of these. A non-exhaustive list of more specific examples of the computer-readable storage medium includes: a portable computer disk, a hard disk, a random-access memory (RAM), a read-only memory (ROM), a flash memory, an optical disk, a memory stick, a floppy disk, a mechanically or visually encoded medium (e.g., a punch card or bar code), and/or any combination of these. A computer-readable storage medium, as used herein, is to be construed as being a non-transitory computer-readable medium. It is not to be construed as being a transitory signal, such as radio waves or other freely propagating electromagnetic waves, electromagnetic waves propagating through a waveguide or other transmission media (e.g., light pulses passing through a fiber-optic cable), or electrical signals transmitted through a wire.

It will be understood that computer-readable program instructions can be downloaded to respective computing or processing devices from a computer-readable storage medium or to an external computer or external storage device via a network, for example, the Internet, a local area network, a wide area network and/or a wireless network. A network interface in a computing/processing device may receive computer-readable program instructions via the network and forward the computer-readable program instructions for storage in a computer-readable storage medium within the respective computing or processing device.

Computer-readable program instructions for carrying out operations of the present disclosure may be assembler instructions, machine instructions, firmware instructions, configuration data for integrated circuitry, or either source code or object code written in any combination of one or more programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network.

All statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable program instructions. These computer-readable program instructions may be provided to a processor or other programmable data processing apparatus to generate a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowcharts, flow diagrams, state transition diagrams, pseudo-code, and the like.

The computer-readable program instructions may also be loaded onto a computer, other programmable data processing apparatus or other devices to cause a series of operational steps to be performed on the computer, other programmable apparatus or other devices to generate a computer-implemented process, such that the instructions which execute on the computer, other programmable apparatus, or other device implement the functions/acts specified in the flowcharts, flow diagrams, state transition diagrams, pseudo-code, and the like.

In some alternative implementations, the functions noted in flowcharts, flow diagrams, state transition diagrams, pseudo-code, and the like may occur out of the order noted in the figures. For example, two blocks shown in succession in a flowchart may, in fact, be executed substantially concurrently, or the blocks may sometimes be executed in the reverse order, depending upon the functionality involved. It will also be noted that each of the functions noted in the figures, and combinations of such functions can be implemented by special-purpose hardware-based systems that perform the specified functions or acts or by combinations of special-purpose hardware and computer instructions.

With these fundamentals in place, we will now consider some non-limiting examples to illustrate various implementations of aspects of the present disclosure.

Computer System

FIG. 1 shows a computer system 100. The computer system 100 may be a multi-user computer, a single user computer, a laptop computer, a tablet computer, a smartphone, an embedded control system, or any other computer system currently known or later developed. Additionally, it will be recognized that some or all the components of the computer system 100 may be virtualized and/or cloud-based. As shown in FIG. 1, the computer system 100 includes one or more processors 102, a memory 110, a storage interface 120, and a network interface 140. These system components are interconnected via a bus 150, which may include one or more internal and/or external buses (not shown) (e.g. a PCI bus, universal serial bus, IEEE 1394 "Firewire" bus, SCSI bus, Serial-ATA bus, etc.), to which the various hardware components are electronically coupled.

The memory 110, which may be a random-access memory or any other type of memory, may contain data 112, an operating system 114, and a program 116. The data 112 may be any data that serves as input to or output from any program in the computer system 100. The operating system 114 is an operating system such as MICROSOFT WINDOWS or LINUX. The program 116 may be any program or set of programs that include programmed instructions that may be executed by the processor to control actions taken by the computer system 100.

The storage interface 120 is used to connect storage devices, such as the storage device 125, to the computer system 100. One type of storage device 125 is a solid-state drive, which may use an integrated circuit assembly to store data persistently. A different kind of storage device 125 is a hard drive, such as an electro-mechanical device that uses magnetic storage to store and retrieve digital data. Similarly, the storage device 125 may be an optical drive, a card reader that receives a removable memory card, such as an SD card, or a flash memory device that may be connected to the computer system 100 through, e.g., a universal serial bus (USB).

In some implementations, the computer system 100 may use well-known virtual memory techniques that allow the programs of the computer system 100 to behave as if they have access to a large, contiguous address space instead of access to multiple, smaller storage spaces, such as the memory 110 and the storage device 125. Therefore, while the data 112, the operating system 114, and the programs 116 are shown to reside in the memory 110, those skilled in the art will recognize that these items are not necessarily wholly contained in the memory 110 at the same time.

The processors 102 may include one or more microprocessors and/or other integrated circuits. The processors 102 execute program instructions stored in the memory 110. When the computer system 100 starts up, the processors 102 may initially execute a boot routine and/or the program instructions that make up the operating system 114.

The network interface 140 is used to connect the computer system 100 to other computer systems or networked devices (not shown) via a network 160. The network interface 140 may include a combination of hardware and software that allows communicating on the network 160. In some implementations, the network interface 140 may be a wireless network interface. The software in the network interface 140 may include software that uses one or more network protocols to communicate over the network 160. For example, the network protocols may include TCP/IP (Transmission Control Protocol/Internet Protocol).

It will be understood that the computer system 100 is merely an example and that the disclosed technology may be used with computer systems or other computing devices having different configurations.

Networked Computing Environment

Figure 2:
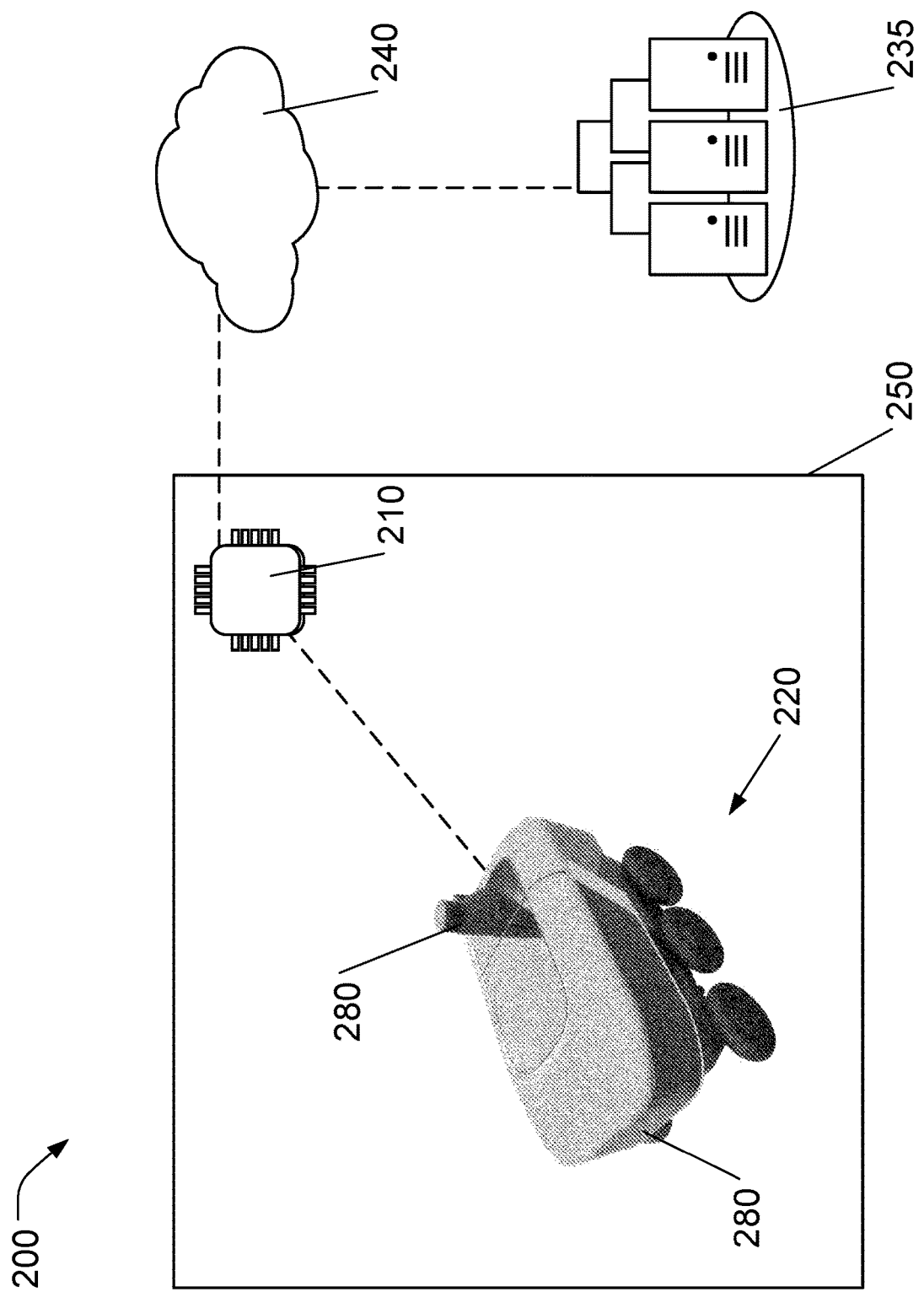
FIG. 2 depicts a networked computing environment including a robotic vehicle, suitable for use with some implementations of the present technology.

FIG. 2 shows a networked computing environment 200 suitable for use with some non-limiting implementations of the present technology. The networked computing environment 200 includes a computing device 210 associated with a robotic vehicle 220. The environment 200 also includes one or more servers 235 in communication with the computing device 210 via a communication network 240 (e.g., the Internet or the like).

In at least some non-limiting implementations of the present technology, the computing device 210 is communicatively coupled to control systems of the robotic vehicle 220. The computing device 210 could be arranged and configured to control different operations systems of the robotic vehicle 220, including but not limited to: motor control, steering systems, and signaling and illumination systems.

In some non-limiting implementations of the present technology, the networked computing environment 200 could include a GPS satellite (not depicted) transmitting and/or receiving a GPS signal to/from the computing device 210. It will be understood that the present technology is not limited to GPS and may employ a positioning technology other than GPS. It should be noted that the GPS satellite can be omitted altogether.

The robotic vehicle 220, to which the computing device 210 is associated, could be any robotic vehicle, for delivery applications, warehouse applications, or the like. Although the robotic vehicle 220 is depicted as being a land vehicle, this may not be the case in each and every non-limiting implementation of the present technology. For example, in certain non-limiting implementations of the present technology, the robotic vehicle 220 may be an aircraft, such as a flying drone, or a watercraft.

The robotic vehicle 220 may be a fully autonomous vehicle, or a partially autonomous vehicle, in which a human operator remotely controls some aspects of the vehicle's operation, while other aspects are automated. As one non-limiting example, the robotic vehicle 220 may operate autonomously unless or until it encounters an unexpected or unusual situation that it is unable to handle autonomously, at which time a remote human operator could be contacted. It should be noted that specific parameters of the robotic vehicle 220 are not limiting, these specific parameters including for example: manufacturer, model, year of manufacture, vehicle weight, vehicle dimensions, vehicle weight distribution, vehicle surface area, vehicle height, motor type, tire type (if tires are used), power system, or other characteristics or parameters of a vehicle.

According to the present technology, the implementation of the computing device 210 is not particularly limited. For example, the computing device 210 could be implemented as a vehicle motor control unit, a vehicle CPU, a computer system built into the robotic vehicle 220, a plug-in control module, and the like. Thus, it should be noted that the computing device 210 may or may not be permanently associated with the robotic vehicle 220.

The computing device 210 could include some or all of the components of the computer system 100 depicted in FIG. 1, depending on the particular implementation. In certain implementations, the computing device 210 is an on-board computer device and includes the processors 102, the storage device 125 and the memory 110. In other words, the computing device 210 includes hardware and/or software and/or firmware, or a combination thereof, for processing data as will be described in greater detail below.

In some non-limiting implementations of the present technology, the communication network 240 is the Internet. In alternative non-limiting implementations of the present technology, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the computing device 210 and the communication network 240, the implementation of which will depend, inter alia, on how the computing device 210 is implemented. Merely as an example and not as a limitation, the communication link can be implemented as a wireless communication link. Examples of wireless communication links may include, but are not limited to, a 3G communication network link, a 4G communication network link, and the like. The communication network 240 may also use a wireless connection with the servers 235.

In some implementations of the present technology, the servers 235 are implemented as computer servers and could include some or all of the components of the computer system 100 of FIG. 1. In one non-limiting example, the servers 235 are implemented as a Dell™ PowerEdge™ Servers running the Microsoft™ Windows Server™ operating system, but can also be implemented in any other suitable hardware, software, and/or firmware, or a combination thereof.

In some non-limiting implementations of the present technology, the processors 102 of the computing device 210 could be in communication with the servers 235 to receive one or more updates. Such updates could include, but are not limited to, software updates, map updates, route updates, geofencing updates, weather updates, and the like. In some non-limiting implementations of the present technology, the computing device 210 can also be configured to transmit to the servers 235 certain operational data, such as routes traveled, traffic data, performance data, and the like. Some or all such data transmitted between the robotic vehicle 220 and the servers 235 may be encrypted and/or anonymized.

It should be noted that a variety of sensors and systems may be used by the computing device 210 for gathering information about surroundings 250 of the robotic vehicle 220. As seen in FIG. 2, the robotic vehicle 220 may be equipped with a plurality of sensor systems 280. It should be noted that different sensor systems from the plurality of sensor systems 280 may be used for gathering different types of data regarding the surroundings 250 of the robotic vehicle 220.

In one example, the plurality of sensor systems 280 may include various optical systems including, inter alia, one or more camera-type sensor systems that are mounted to the robotic vehicle 220 and communicatively coupled to the processors 102 of the computing device 210. Broadly speaking, the one or more camera-type sensor systems may be configured to gather image data about various portions of the surroundings 250 of the robotic vehicle 220. In some cases, the image data provided by the one or more camera-type sensor systems could be used by the computing device 210 for performing object detection procedures. For example, the computing device 210 could be configured to feed the image data provided by the one or more camera-type sensor systems to an Object Detection Neural Network (ODNN) that has been trained to localize and classify potential objects in the surroundings 250 of the robotic vehicle 220.

In another example, the plurality of sensor systems 280 could include one or more radar-type sensor systems that are mounted to the robotic vehicle 220 and communicatively coupled to the processors 102. Broadly speaking, the one or more radar-type sensor systems may be configured to make use of radio waves to gather data about various portions of the surroundings 250 of the robotic vehicle 220. For example, the one or more radar-type sensor systems may be configured to gather radar data about potential objects in the surroundings 250 of the vehicle 220, such data potentially being representative of a distance of objects from the radar-type sensor system, orientation of objects, velocity and/or speed of objects, and the like.

In a further example, the plurality of sensor systems 280 could include one or more LIDAR systems that are mounted to the robotic vehicle 220 and communicatively coupled to the processors 102. Broadly speaking, a LIDAR system is configured to capture data about the surroundings 250 of the robotic vehicle 220 used, for example, for building a multi-dimensional map of objects in the surroundings 250 of the robotic vehicle 220. The LIDAR system could be mounted to the robotic vehicle 220 in a variety of locations and/or in a variety of configurations for gathering information about surroundings 250 of the robotic vehicle 220.

In the context of the present technology, the computing device 210 is configured to detect one or more objects in the surroundings 250 of the robotic vehicle 220 based on data acquired from one or more camera systems and from one or more LIDAR systems. For example, the computing device 210 configured to detect a given object in the surroundings 250 of the vehicle 220 may be configured to identify LIDAR data and camera data associated with the given object, generate an "embedding" representative of features associated with the given object, and detect the object by generating a bounding box for the object.

Robotic Vehicle Operation

Implementations of the disclosed technology provide navigation or motion planning for operating a robotic vehicle in an environment that includes both static and dynamic (i.e., moving) objects. As described herein, the robotic vehicle is described in the context of a small land-based robotic vehicle intended to deliver goods, packages, boxes, or other parcels in an urban or suburban setting. Because of the tasks that it performs, such a robotic vehicle normally travels along sidewalks and footways. Thus, the motion planning module in the vehicle should consider the behavior of pedestrians moving along or crossing its path.

Additionally, the robotic vehicle may cross roads. Cars and other vehicles moving on roads in urban and suburban settings may not notice small-sized robotic vehicles, which may lead to collisions that could damage or destroy the robotic vehicle and its cargo. Consequently, the motion planning module for such a robotic vehicle should consider objects in a roadway, including, e.g., moving and parked cars and other vehicles.

For a delivery vehicle, one important goal may be to deliver a parcel from a starting point to a destination by a particular time. Thus, the motion planning module should consider the speed of the robotic vehicle and determine that adequate progress is being made toward the destination. These considerations are particularly relevant when the delivery tasks are time-critical or when the destination is remote.

For purposes of illustration, the example robotic vehicle uses LIDAR and other sensors located on various sides of the vehicle. A computing device associated with the robotic vehicle receives the data from the sensors and generates a 3D map of points. This 3D map of points may be used by the robotic vehicle to, e.g., obtain a distance from surrounding objects and to determine a trajectory and speed.

In accordance with various implementations of the disclosed technology, two separate models are used in the motion planning module to determine a trajectory and speed for the robotic vehicle. A prediction model is used to predict the motion of dynamic objects detected by the robotic vehicle and to assign scores to possible actions of the robotic vehicle based on these predictions. A separate analytical model is used to assign scores to the possible actions of the robotic vehicle based on the presence of static objects detected by the robotic vehicle. These scores are combined to generate a set of scores that may be used to determine an action for the robotic vehicle. In some implementations, these models may generate scores concurrently, while in other implementations, the prediction model may first be used to generate scores, and then the analytical model may be used to check only the actions that, based on scores from the prediction model, are unlikely to come close to a dynamic object. The analytical model may penalize any of these actions that would cause the robotic vehicle to come too close or to collide with a static object.

It will be understood by those of ordinary skill in the art that although a ground-based delivery vehicle is being used as an example, techniques similar to those described herein may be used in a wide variety of robotic vehicle applications. Use of separate models for dynamic objects and static objects could be applied in the motion planning modules for many applications and types of robotic vehicles.

Figure 3:
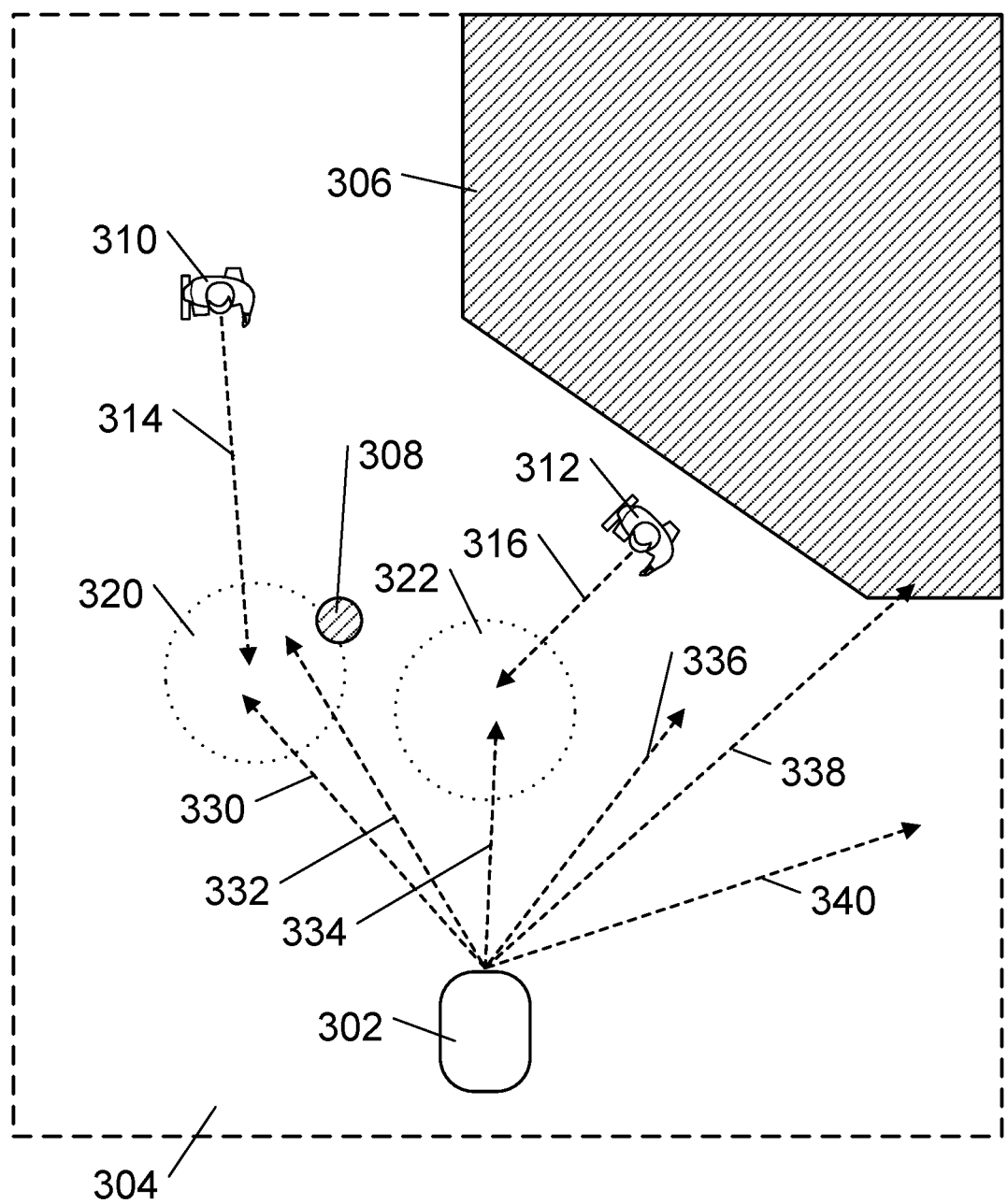
FIG. 3 shows an overview of a scenario in which various implementations of the disclosed technology may be used.

FIG. 3 shows an overview of a scenario in which various implementations of the disclosed technology may be used. In the example shown in FIG. 3, a robotic vehicle 302 is navigating in a public pedestrian area 304, which includes a building 306, and a lamp post 308, which are the static objects in an immediate vicinity of the robotic vehicle 302. Additionally, pedestrians 310 and 312 are moving in the pedestrian area 304 and are the dynamic objects in the immediate vicinity of the robotic vehicle 302. At a first time, the pedestrians 310 and 312 are located at the positions shown in FIG. 3, but since they are moving (their motion shown by vectors 314 and 316, respectively), the robotic vehicle 302 may predict their locations at a second, later time to determine where the robotic vehicle 302 may navigate without coming too close to either of the pedestrians 310 and 312.

In accordance with various implementations of the disclosed technology, to determine a trajectory and speed for the robotic vehicle 302, a motion planning module (not shown) associated with the robotic vehicle applies a prediction model to predict the positions of dynamic objects at the second time and to determine scores for possible actions of the robotic vehicle 302 based on these predictions. In the scenario shown in FIG. 3, the prediction model predicts that the pedestrian 310 will be in the area 320 at the second time, and the pedestrian 312 will be in the area 322 at the second time. Accordingly, actions of the robotic vehicle, in this case trajectories and velocities, that would move the robotic vehicle into either the area 320 or the area 322 receive low scores from the prediction model. In some implementations, the scores may be based on a probability that a dynamic object (e.g., pedestrians 310 and 312) will be near the robotic vehicle at the second time if the robotic vehicle follows a particular trajectory at a particular speed, with greater probability of a dynamic object being close will result in a lower score.

In the example shown in FIG. 3, because the actions (i.e., trajectory and speed) represented by vectors 330 and 332 will place the robotic vehicle 302 in the area 320, where there is a high probability of the pedestrian 310 being located at the second time, these actions will receive relatively low scores—in this example, scores of 0.1 and 0.2, respectively. Similarly, since the action represented by the vector 334 will place the robotic vehicle 302 in the area 322, where there is a high probability of the pedestrian 312 being located at the second time, this action will receive a relatively low score from the prediction model. In this example, the action represented by the vector 334 may receive a score of 0.1. The actions represented by the vectors 336, 338, and 340 are unlikely to move the robotic vehicle close to a dynamic object, so these actions receive relatively high scores from the prediction model in this example, 0.8, 0.9, and 0.8, respectively.

The motion planning module associated with the robotic vehicle 302 also includes an analytical model that assigns scores to possible actions of the robotic vehicle (in this example, a trajectory and speed) based on whether the action will likely cause the robotic vehicle to come too close to or collide with a static object, such as the building 306 or the lamp post 308. In the example shown in FIG. 3, the actions represented by the vectors 332 and 338 will be given low scores, since these actions may result in the robotic vehicle 302 coming very close to or colliding with the lamp post 308 and the building 306, respectively. In this example, the action represented by the vector 332 is given a score of 0.2, since it is likely that the robotic vehicle 302 will only come very close to the lamp post 308 but might not collide with it. The action represented by the vector 338 is given a score of 0, since this action will almost certainly result in a collision with the building 306. The actions represented by the vectors 330, 334, 336, and 340 will each receive a score of 1, since they are very unlikely to come too close to a static object.

The motion planning module combines scores from the prediction model and the analytical model to generate a score for each of the actions for the robotic vehicle 302. It will be understood that the scores generated by the analytical model are likely to be more accurate than the scores from the prediction model, since it is not as difficult to determine whether the robotic vehicle 302 is likely to move close to or collide with a static object. It may be more difficult to accurately predict the actions of dynamic objects, so there will likely be greater uncertainty in the scores generated by the prediction model than in those generated by the analytical model.

In some implementations, the scores generated by the prediction model may be given greater weight when combining scores than the scores generated by the analytical model, despite their greater uncertainty. This is because a collision with a dynamic object is more likely to cause injury to people than a collision with a static object, which may cause property damage, but is much less likely to cause injury.

In some implementations, a weighted sum may be used to combine scores from the prediction model and the analytical model. In some implementations, a weighted product may be used to combine the scores. Of course, it will be understood that other ways of combining the scores may also be used. In some implementations, low scores may be represented by negative values, so low scores will reduce the combined score in a weighted sum. In some implementations, rules may be applied to combining the scores. For example, in some implementations, a rule may be applied so that if either model assigns a score of zero, the combination will be assigned a score of zero.

For the example shown in FIG. 3, a weighted sum is used, with each model being given an equal weight, and a combined score of zero being assigned if either of the models generated a score of zero. Based on this method of combining the scores, the combined scores for the actions represented by vectors 330, 332, 334, 336, 338, and 340 are 0.55, 0.2, 0.55, 0.9, 0, and 0.9, respectively. The actions with the highest scores based only on the combination of the prediction and analytical models are the actions represented by the vectors 336 and 340. These two actions may be further scored based on other factors, such as the map and the target destination of the robotic vehicle 302. For example, if the action represented by the vector 336 will place the robotic vehicle on a more direct path to its destination than the action represented by the vector 340, than the score for that action may be increased, causing the motion planning module to select that action.

It will be understood that similar results could be reached in some implementations by first applying the prediction model, and then applying the analytical model only to those possible action that had been given relatively high scores by the prediction model. The analytical model would penalize the scores for those actions that would result in the robotic vehicle coming too close to or colliding with a static object.

Figure 4:
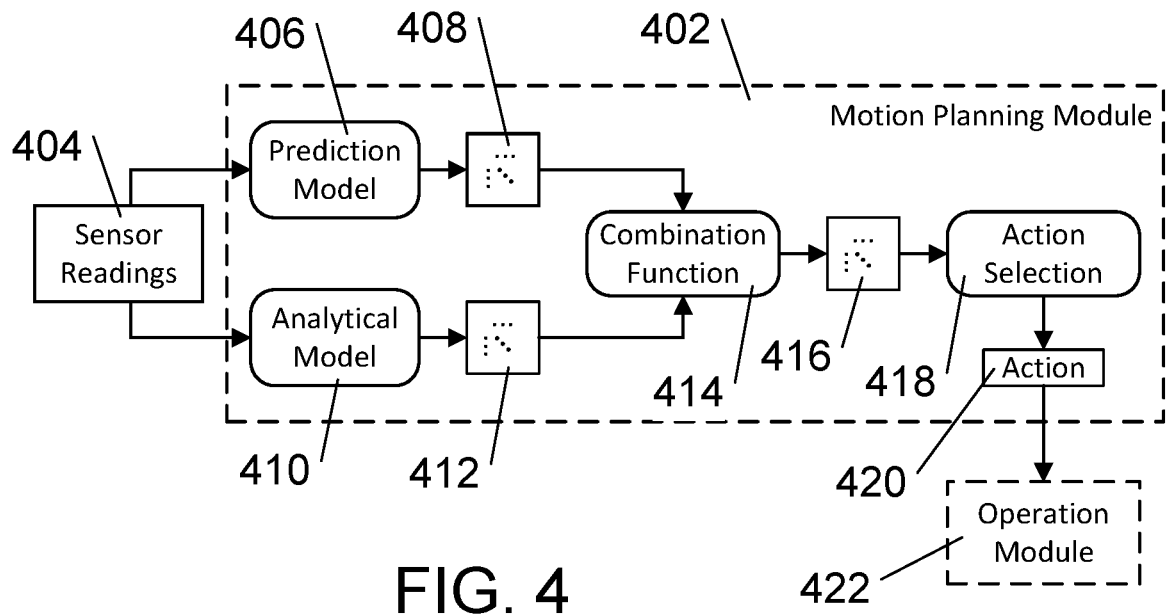
FIG. 4 is a block diagram depicting the operation of an example motion planning module in accordance with various implementations of the disclosed technology.

FIG. 4 shows a block diagram of a portion of a motion planning module 402 in accordance with some implementations of the described technology. Sensor readings 404, are used by a prediction model 406 to generate an array 408 of scores for actions, in which, e.g., a horizontal axis of the array represents an angular direction for the robotic vehicle (not shown in FIG. 4) and a vertical axis of the array represents a speed for the robotic vehicle.

In various implementations, the prediction model 406 may use a pretrained neural network (not shown) to generate the array 408 of scores. The pretrained neural network takes as input sensor readings including information on dynamic objects within a sensor range of the robotic vehicle, which may include, e.g., data indicative of the types, coordinates, speeds, and trajectories of dynamic objects, and information about the surrounding environment and conditions. As output, the pretrained neural network generates the array 408 of scores indicative, at least in part, of a probability of the robotic vehicle encountering a dynamic object if the robotic vehicle moves in a particular angular direction at a particular speed (e.g., with lower scores representing higher probabilities of the robotic vehicle encountering a dynamic object).

The pretrained neural network may be trained on a server or other system, using a large training dataset including pre-recorded data indicative of the types, coordinates, speeds, and trajectories, and information about the surrounding environment for many dynamic objects, as well as information on the actual location and resulting scores for the dynamic objects. It will be understood by those of ordinary skill in the art that training of a neural network is a compute-intensive task, best handled on fast, specialized systems. Once the neural network is trained, and is producing good results on test data, then the trained neural network may be sent to the robotic vehicles that will be using the pretrained neural network.

The sensor readings 404 may also be sent to an analytical model 410 within the motion planning module 402. The analytical model 410 uses the sensor readings, and may use other information, such as map data (not shown), to generate an array 412 of scores for actions, in which, e.g., a horizontal axis of the array represents an angular direction for the robotic vehicle (not shown in FIG. 4) and a vertical axis of the array represents a speed for the robotic vehicle. The scores in the array 412 are indicative of the presence of static objects in the path of the robotic vehicle for each of the angular directions and speeds. In some implementations, the scores represent a probability of the robotic vehicle coming close to or colliding with the static objects. In some implementations, the scores may indicate the presence or absence of a static object in the path of the robotic vehicle for each angular direction and speed.

The analytical model 410 can use any of a wide variety of known methods to generate the array 412 of scores. Because the static objects have known locations, and do not move, there are many known ways of determining whether the path of the robotic vehicle will intersect such static objects for each angular direction and speed of the robotic vehicle. For example, well-known collision detection algorithms can be used to check whether a bounding box of the robotic vehicle will overlap the boundaries of a static object. The analytical model 410 will generally produce more precise or accurate results than will the prediction model 406.

Once the arrays of scores 408 and 412 have been generated, which may be done in parallel in some implementations, the arrays are combined by a combination function 414. As discussed above, the combination function 414 may combine the arrays of scores 408 and 412 using various combination methods, such as a weighted sum, a weighted product, a rules-based combination, or other ways of combining the scores in the arrays 408 and 412. The combination function 414 produces a combined score array 416, which may be sent to an action selection module 418. In some implementations, the array of scores 408 generated by the prediction model 406 is given greater weight than the array of scores 412 generated by the analytical model. This may be done, for example, to give greater weight to avoiding encounters with dynamic objects, such as pedestrians, when determining an action for the robotic vehicle.

The action selection module 418 determines an action for the robotic vehicle based on the combined score array 416. In some implementations, this may be done by finding the actions (i.e., angular direction and speed for the robotic vehicle) with the highest scores. The action selection module 418 may also select an action based on other factors, such as a map of the area (not shown) and the target destination (not shown). The action selection module 418 determines an action 420, which is sent to an operation module 422 to operate the robotic vehicle.

Figure 5:
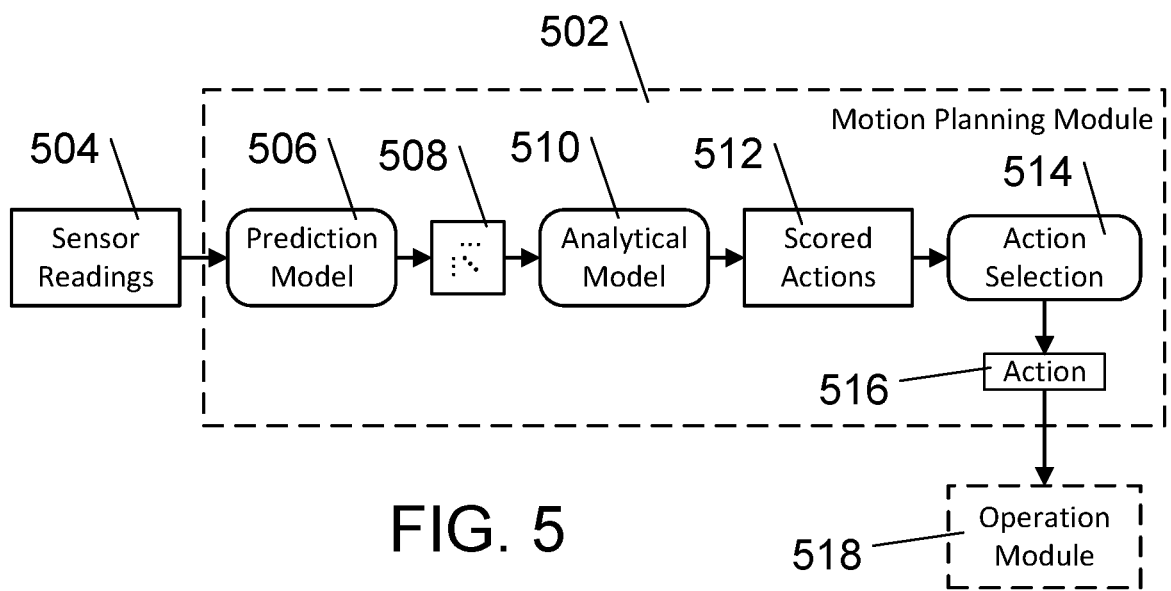
FIG. 5 is a block diagram showing the operation of an alternative implementation of a motion planning module in accordance with the disclosed technology.

FIG. 5 shows a block diagram of a portion of a motion planning module 502 in accordance with an alternative implementation of the described technology. Sensor readings 504, are used by a prediction model 506 to generate an array 508 of scores for actions, in which, e.g., a horizontal axis of the array represents an angular direction for the robotic vehicle (not shown in FIG. 4) and a vertical axis of the array represents a speed for the robotic vehicle.

As in the implementation described with reference to FIG. 4, the prediction model 506 may use a pretrained neural network (not shown) to generate the array 508 of scores. The pretrained neural network takes as input sensor readings including information on dynamic objects within a sensor range of the robotic vehicle, which may include, e.g., data indicative of the types, coordinates, speeds, and trajectories of dynamic objects, and information about the surrounding environment and conditions. As output, the pretrained neural network generates the array 508 of scores indicative, at least in part, of a probability of the robotic vehicle encountering a dynamic object if the robotic vehicle moves in a particular angular direction at a particular speed (e.g., with lower scores representing higher probabilities of the robotic vehicle encountering a dynamic object).

The array 508 may then be sent to an analytical model 510, which will determine whether the robotic vehicle will come close to or collide with a static object. To make this determination, the analytical model 510 may make use of the sensor readings 504, as well as other information, such as map data (not shown). The analytical model 510 generates scores that will penalize actions that will likely result in coming close to or colliding with a static object.

In some implementations, the analytical model 510 may filter out actions that have been determined by the prediction model 506 to have a high probability of resulting in an encounter with a dynamic object (i.e., actions having a low score in the array of scores 508). By doing this, the analytical model 510 may reduce the number of actions that it examines to determine whether the action may result in coming close to or colliding with a static object.

The analytical model 510 may then combine the scores that it has determined with the scores generated by the prediction model 506 and select a scored set of actions 512 with the best scores to send to the action selection module 514. Combining the scores may be accomplished using a weighted sum, a weighted product, or other combination methods. As discussed above, in some implementations, the scores in the array of scores 508 may be given greater weight than the scores generated by the analytical model 510.

The action selection module 514 determines an action for the robotic vehicle based on the scored set of actions 512. In some implementations, this may be done by finding the actions (i.e., angular direction and speed for the robotic vehicle) with the highest scores. The action selection module 514 may also select an action based on other factors, such as a map of the area (not shown) and the target destination (not shown). The action selection module 514 determines an action 516, which is sent to an operation module 518 to operate the robotic vehicle.

Figure 6:
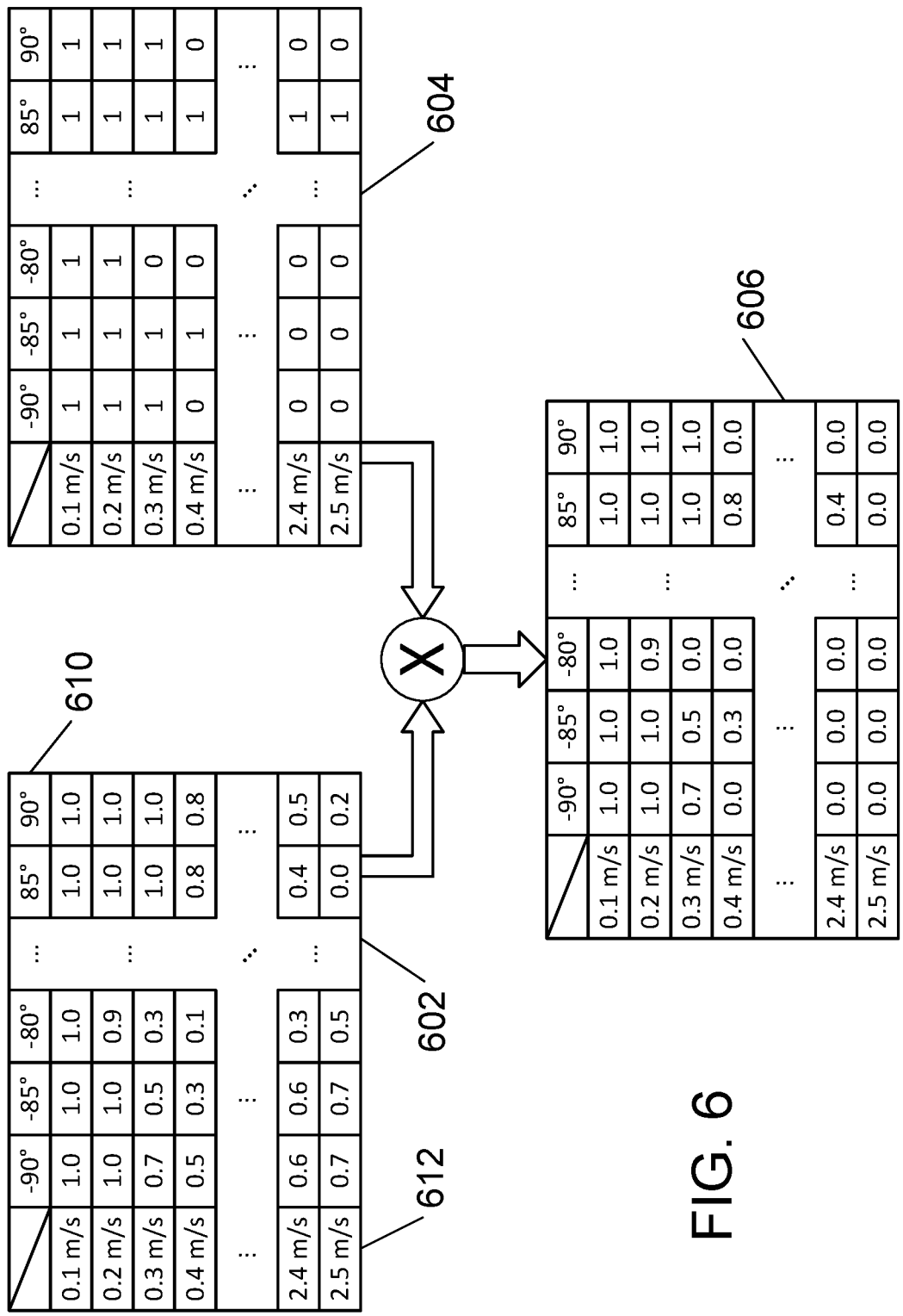
FIG. 6 shows example score arrays that may be generated by a prediction model and an analytical model, as well as an example combination of the score arrays, in accordance with various implementations of the disclosed technology.

FIG. 6 shows an example array of scores 602 resulting from application of a prediction model in accordance with various implementations of the disclosure, an example array of scores 604 resulting from application of an analytical model in accordance with various implementations of the disclosure, and an example combination array 606 resulting from a combination of the arrays 602 and 604.

As can be seen, the array of scores 602 has a horizontal axis 610 corresponding to an angular direction of the robotic vehicle (not shown) and a vertical axis 612 corresponding to a speed for the robotic vehicle. In this example the angular directions range from −90° to 90° in 5° increments, and the speeds range from 0.1 m/s up to 2.5 m/s in 0.1 m/s increments. It will be understood that these values are only for illustration, and that different ranges, intervals, and units could be used. The array of scores 604 and the combination array 606 have similar horizontal and vertical axes (not labeled in FIG. 6).

In the example shown in FIG. 6, the array of scores 602, resulting from the prediction model (i.e., the scores based on dynamic objects) range from 0 (i.e., extremely high probability of encountering a dynamic object) to 1 (i.e., extremely low probability of encountering a dynamic object). The array of scores 604, resulting from the analytical model (i.e., the scores based on static objects) contains binary values in this example—either 0 if a coming too close to or colliding with a static object will occur, or 1 if the path is clear of static objects. It should be noted that, due to the structure of the array of scores 604, once a "0" occurs at a particular angular direction and speed, a "0" will be present in the array at that angular direction for all higher speeds (since all higher speeds will also cause the robotic vehicle to come too close to or collide with a static object along the path represented by the angular velocity). This observation may reduce the number of checks for static objects that are performed in the analytical model. It will be understood that different scores or ranges of scores may be used in some implementations. For example, the array of scores 604 may include scores in a range, that penalize an action by a greater or lesser degree, depending on how close the robotic vehicle will come to a static object. Similarly, the arrays 602 and 604 may include values outside of the range of 0 to 1 and may include negative scores in some implementations.

The combination array 606 in the example that is shown in FIG. 6 is generated by moving the score from the array 602 to the combination array 606 if the corresponding value in the array 604 is "1" and placing a score of "0" in the combination array 606 if the corresponding value in the array 604 is "0". Thus, in this example, the combination array 606 is a kind of product of the arrays 602 and 604. It will be understood that there are many other ways of combining scores associated with dynamic objects and scores associated with static objects that could be used in various implementations of the disclosed technology, including, e.g., weighted sums, weighted products, and rule-based combinations.

It should also be understood that in some implementations, in which the analytical model is used after the prediction model and examines only actions that have a score indicating that an encounter with a dynamic object is unlikely, the array 604 and the combination array 606 may be replaced, e.g., with lists or sets of actions that are to be considered. Similarly, in some implementations, the analytical model may place a value in each location in the array 604 that indicates that that location need not be examined, since the prediction model indicated a high probability of encountering a dynamic object.

Figure 7:
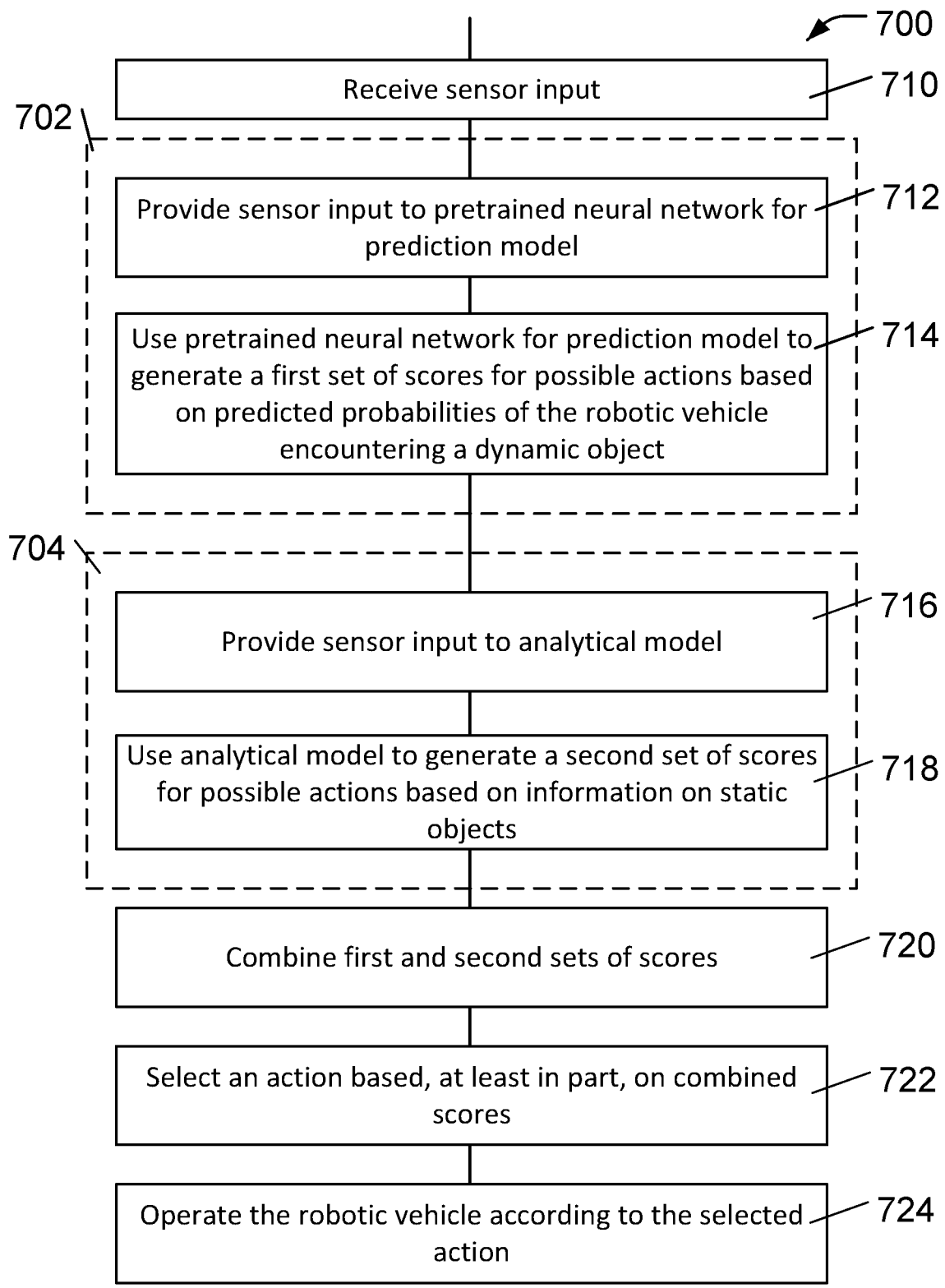
FIG. 7 shows a flowchart of a motion planning method in accordance with various implementations of the disclosed technology.

FIG. 7 shows a flowchart of a method for operating a robotic vehicle in accordance with various implementations of the disclosed technology. The method 700 includes two main sections: a prediction model section 702; and an analytical model section 704. The prediction model section 702 generates scores based on predicted probabilities of the robotic vehicle encountering a dynamic object, such as a pedestrian or a moving vehicle. The analytical model section 704 generates scores based on static objects, such as buildings, in the path of the robotic vehicle.

At block 710, a computing device associated with the robotic vehicle receives a sensor input from at least one sensor associated with the robotic vehicle. The sensor input provides information on dynamic and static objects in a vicinity (generally, the range of the sensors being used) of the robotic vehicle. This sensor input may be provided, for example, by a LIDAR system, cameras, and other sensors used by the robotic vehicle. In some implementations, the sensor input may include information on dynamic objects within a sensor range of the robotic vehicle, which may include, e.g., data indicative of the types, coordinates, speeds, and trajectories of dynamic objects, and information about the surrounding environment and conditions. In some implementations, the sensor input may be preprocessed to provide, e.g., an overhead map of the area in the vicinity of the robotic vehicle, including both static and dynamic objects.

At block 712, in the prediction model section 702 of the model, the sensor input is used as input to a pretrained neural network, and at block 714, the neural network generates a first set of scores. Each of the scores is associated with a possible action of the robotic vehicle, and the scores represent, at least in part, a probability of the robotic vehicle encountering a dynamic object if the possible action is taken, based on motion predictions for the dynamic objects. In some implementations, the output of the neural network may be in the form of an array of scores, in which a horizontal axis of the array represents an angular direction in which the robotic vehicle may move, and a vertical axis of the array represents a speed at which the robotic vehicle may move. In some implementations, a low score may indicate that there is a relatively high probability (e.g., 0.5 or higher) that the robotic vehicle will encounter a dynamic object, while a high score indicates that there is a relatively low probability (e.g., 0.1 or lower) of encountering a dynamic object. Of course, it will be understood that there may be other values that represent a relatively high probability or relatively low probability of encountering a dynamic object, and that the values provided here are merely examples. Similarly, the value of a "high" score or a "low" score may vary, depending on the range of scores.

At block 716, in the analytical model section 704, the sensor input, and possibly other information, such as map information, are provided to an analytical model. At block 718, the analytical model generates a second set of scores. Each of the scores is associated with a possible action of the robotic vehicle, and the scores represent, at least in part, whether there will be a static object in the path of the robotic vehicle if the possible action, based on information on the static objects. There are many ways in which the analytical model can generate the scores. For example, in some implementations, a collision detection algorithm could be used to determine whether a bounding box of the robotic vehicle will overlap a static object. Because the static objects do not move, the analytical model section 704 may be more accurate than the prediction model section 702. In some implementations, the prediction model section 702 may operate in parallel with the analytical model section 704, while in other implementations, the prediction model section 702 may execute either before or after the analytical model section 704.

At block 720, the first set of scores and the second set of scores are combined to generate a set of combined scores. As discussed above, combining the scores may be done in a variety of ways, such as a weighted sum, a weighted product, or a rules-based combination (though it will be understood that these are merely examples, and other ways of combining the first and second sets of scores could also be used). In some implementations, the first set of scores may be given a greater weight than the second set of scores, to place a higher value on avoiding encounters with dynamic objects, such as people, than on avoiding coming too close to static objects. Additionally, in some implementations, combining the scores may be handled as part of the analytical model section 704, and in some implementations, combining the scores may be handled as part of the prediction model section 702.

At block 722, the combined scores are used to select an action for the robotic vehicle. This may be done, for example, by selecting the action associated with the best or the highest score. Other considerations, such as the destination of the robotic vehicle and the map may also be used to select an action.

At block 724, the robotic vehicle is operated according to the selected action.

Example Artificial Neural Network Structure

Figure 8:
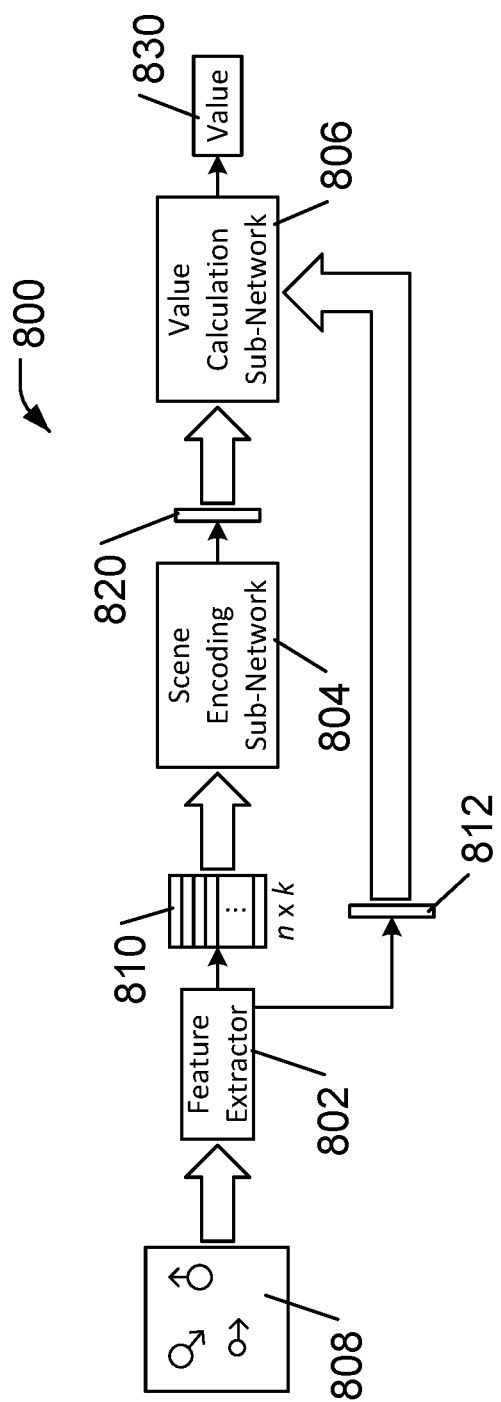
FIG. 8 shows a block diagram of a structure of an artificial neural network in accordance with an example implementation of the disclosed technology.

In accordance with various implementations of the disclosed technology, a neural network-based prediction model is used to predict the motion of dynamic objects. In this section, an example of the structure and training of such a neural network is described. FIG. 8 shows an example structure 800 of an artificial neural network and associated elements for generating a score or value for a potential action of a robotic vehicle based on the predicted motion of dynamic objects and the robotic vehicle's surroundings.

The structure 800 includes a feature extractor 802, a scene encoding sub-network 804, and a value calculation sub-network 806. The feature extractor 802 extracts features of objects (not shown) in a scene 808. The scene 808 may be based on sensor inputs or (in the case of training) based on a simulation. Objects may have properties such as a position, a radius, and a velocity (including speed and direction). The feature extractor 802 converts the scene 808 into coordinates centered on the robotic vehicle and creates a matrix 810 including the extracted features for each identified object in the scene. The matrix 810 has n rows, where n is the number of objects, with k values per row, where k is the number of features. In some implementations, the extracted features may be the properties identified above for each object. The matrix 810 serves as input to the scene encoding sub-network 804. Additionally, the feature extractor 802 provides a robotic vehicle feature vector 812, which represents the robotic vehicle. The robotic vehicle feature vector 812 may include goal coordinates for the robotic vehicle, in addition to other features. The robotic vehicle feature vector 812 serves as one input to the value calculation sub-network 806.

The scene encoding sub-network 804 takes the matrix 810 as input and generates a scene vector 820, which is a single vector that represents the input scene 808. The scene vector 820 and the robotic vehicle feature vector 812 are used as inputs to the value calculation sub-network 806, which generates a value 830, which is a single score for a potential action of the robotic vehicle.

Figure 9:
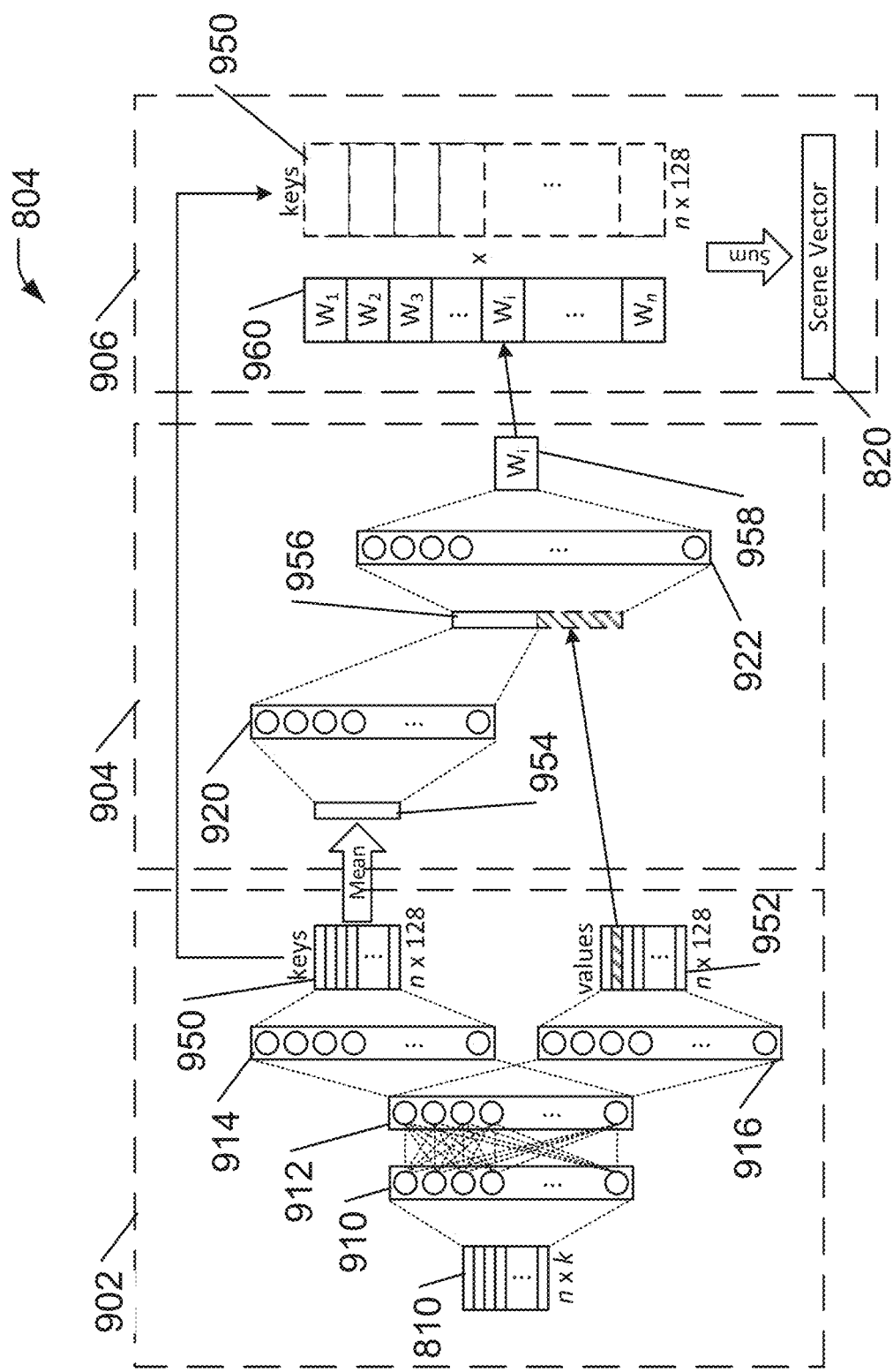
FIG. 9 shows a block diagram of a scene encoding sub-network portion of the artificial neural network structure of the example implementation depicted in FIG. 8.

FIG. 9 shows an example structure for the scene encoding sub-network 804. As discussed above, the scene encoding sub-network 804 takes the matrix 810, having a row for each object in the scene 808, as input. In a first portion 902 of the scene encoding sub-network 804, each row of the matrix 810 serves as input to a layer 910, the outputs of which serve as inputs to a layer 912. The layers 910 and 912 are fully connected layers of 128 artificial neurons per layer in the example implementation, and use a ReLU ("Rectified Linear Unit") non-linear activation function. It will be understood that in FIG. 9, only a few of the artificial neurons and connections between them are shown, to more clearly illustrate the overall structure of the scene encoding sub-network 804.

In the example implementation, the output vector of the layer 912 is used as input to two fully connected linear layers 914 and 916, each of which includes 128 artificial neurons. The layer 914 generates a "key" vector of 128 values, and the layer 916 generates a "value" vector of 128 values. Thus, processing all the rows of the matrix 810 with the first portion 902 of the scene encoding sub-network 804 generates n "key" vectors 950 and n "value" vectors 952.

In a second portion 904 of the scene encoding sub-network 804, the mean of each value of the n "key" vectors 950 is calculated to generate a mean vector 954, having 128 values. The mean vector 954 is used as input to a fully connected linear layer 920, with 128 artificial neurons in the example implementation, to generate a "query" vector 956, including 128 values.

For each of the "value" vectors 952, that "value" vector is concatenated with the "query" vector, and the combined vector is used as input to a fully connected layer 922, with 258 artificial neurons in the example implementation. The layer 922 may use the well-known softmax function as a non-linear activation function. The layer 922 generates an attention weight 958 as output. Thus, processing the n "value" vectors 952 in second portion of the scene encoding sub-network 804 generates n attention weights 960. A softmax operation may be applied to the n attention weights 960 to form a distribution that sums to 1.

In an output portion 906 of the scene encoding sub-network 804, the n attention weights 960 are used to generate the scene vector 820. As shown in FIG. 9, in one example implementation, the n "key" vectors 950 are multiplied by the n attention weights 960, and summed to generate the scene vector 820.

Figure 10:
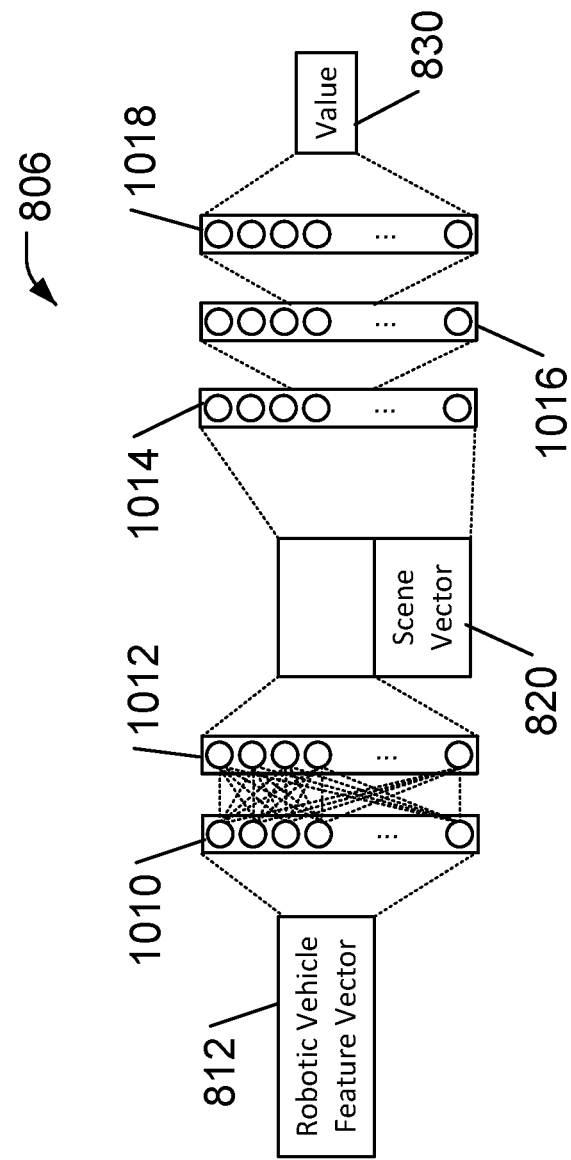
FIG. 10 shows a block diagram of a value calculation sub-network portion of the artificial neural network structure of the example implementation depicted in FIG. 8.

FIG. 10 shows an example structure for the value calculation sub-network 806. In this example implementation, the robotic vehicle feature vector 812 is used as input to a fully connected layer 1010 of 128 artificial neurons, and using a ReLU non-linear activation function. Output from the layer 1010 is used as input to a fully connected layer 1012 of 128 artificial neurons, and using a ReLU non-linear activation function. Output from the layer 1012 is then concatenated with the scene vector 820 generated by the scene encoding sub-layer, and the combined vector is used as input to a series of three fully connected layers 1014, 1016, and 1018. Each of the layers 1014, 1016, and 1018 includes 128 artificial neurons in the example implementation, and each uses a ReLU non-linear activation function. Output from layer 1014 is used as input to layer 1016, and output from layer 1016 is used as input to layer 1018. The output of layer 1018 is the value 830, which may be used as a score for a potential action of the robotic vehicle.

Training the artificial neural network described above with reference to FIGS. 8-10 is done using a scene simulation module that generates simulated scenes in which objects move according to a policy. The simulated scenes simulate the movement of objects at regular time steps. For example, in some implementations, a time step of 0.25 seconds may be used. At each time step, updated properties for all objects in the simulated scene and for the robotic vehicle are provided.

Movement of dynamic objects in the simulated scene can be handled using a variety of policies. For example, linear motion of dynamic objects in the simulated scene may be used. Alternatively, an empirical method could be used to simulate the movement of dynamic objects. One example of such a method is ORCA (Optimal Reciprocal Collision Avoidance), as described in Van den Berg et al., "Reciprocal n-body collision avoidance", in Pradalier et al. (eds.), *Robotics Research: The 14th International Symposium ISRR, Springer Tracts in Advanced Robotics*, vol. 70, May 2011, pages 3-19. Alternatively, a machine learning algorithm trained using observations of the motion of various types of dynamic objects, could be used to simulate the movement of dynamic objects in a simulated scene.

Figure 11:
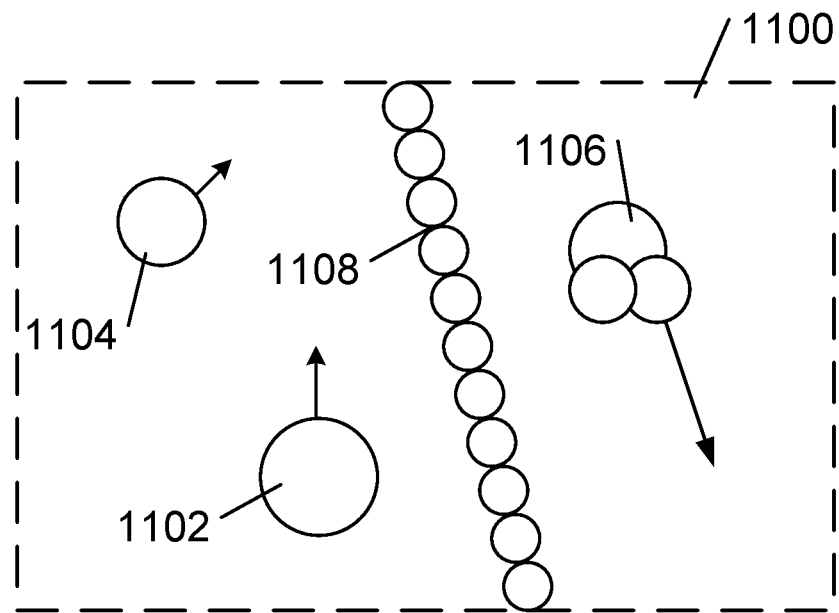
FIG. 11 shows a simulated scene of a type that may be used to train the artificial neural network of the example implementation depicted in FIG. 8.

FIG. 11 shows a simulated scene 1100 of the type that may be used to train the artificial neural network described above with reference to FIGS. 8-10. The simulated scene 1100 includes representations of the robotic vehicle 1102, a pedestrian 1104, a vehicle 1106, and a curb 1108 (i.e., the boundary of a road on which the vehicle 1106 travels). Each of these is represented in the simulated scene 1100 by one or more circles, each of which has properties, such as a position (e.g., x,y coordinates), a radius, and a velocity (speed and direction). Arrows in FIG. 11 indicate the velocities of dynamic objects. Some objects, such as the vehicle 1106 and the curb 1108 may be represented by a set of circles. Static objects, such as the curb 1108, have a velocity of zero.

At each time step, the positions, velocities, and other properties of the objects in the scene 1100 are updated according to the policies (as discussed above) that are being used to simulate movement. The objects and their updated properties are provided to a feature extractor, such as the feature extractor 802 of FIG. 8, for use in training the artificial neural network. A series of such time steps for a simulated scene over a simulated period of time may be referred to as a simulated scene episode.

Figure 12:
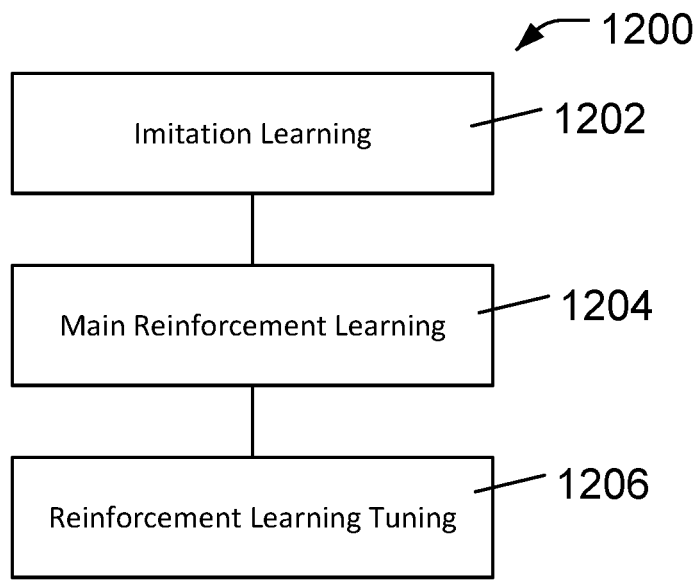
FIG. 12 shows a block diagram of a multi-stage method for training the artificial neural network of the example implementation depicted in FIG. 8.

FIG. 12 shows a block diagram of a method 1200 of training the artificial neural network of the example implementation. In an example implementation, training may be performed on a system having an 8-core CPU, a 1080 Ti Graphics Processing Unit (GPU), manufactured by NVIDIA™ Corporation, of Santa Clara, California, 16 GB of operating memory and at least 10 GB of storage space (e.g., on a hard disk). In the example implementation, training the artificial neural network is performed in a single thread (in a single process), but may be parallelized using well-known methods. The training time of the example implementation on such a system is about 12 hours.

Block 1202 is an imitation learning stage of the training process. As will be understood by those of ordinary skill in the art, imitation learning is a form of supervised learning, in which the "correct" behavior given a set of conditions is demonstrated by a trainer (typically a human). A training set for imitation learning may provide both a simulated scene, and for each such simulated scene, a trainer-determined action.

In the example implementation, with simulated scene episodes in which each simulated scene has dynamic object properties and robotic vehicle trajectories, the system learns a value function for taking the "best" steps or series of actions. The goal of this stage is to initialize and pre-train the artificial neural network to have some baseline ability to control a robotic vehicle, to at least some extent, and a policy (i.e., for determining the robotic vehicle's action given a scene) with a baseline quality and determined behavior at the beginning of the next stage.

The imitation learning stage of the block 1202 uses a well-known stochastic gradient descent (SGD) optimization technique and a well-known mean squared error (MSE) loss function for training the artificial neural network. In the example implementation, it may be trained using 1000 simulated scene episodes, with a learning rate of 0.01 and a duration of about one hour.

Block 1204 is a "main" reinforcement learning (RL) stage. Block 1204 uses a well-known off-policy RL algorithm, such as a Q-Learning algorithm, as described, e.g., in Watkins and Dayan, "Q-Learning", *Machine Learning*, vol. 8, pages 279-292, 1992 or Double Q-Learning, as described, e.g., in Hasselt, "Double Q-Learning", in Lafferty et al. (eds.), *Advances in Neural Information Processing Systems*, pages 2613-2621, 2010. In the example implementation, experience replay is used, with an experience replay buffer that stores the last 100,000 steps, and that may be updated from new simulations. With the given dataset, updatable by new simulated scenes, the value function is trained for a possible action at each simulation step.

The main reinforcement learning stage of the block 1204 uses a well-known SGD optimization technique and a well-known MSE loss function for training the artificial neural network. In the example implementation, it may be trained using 8000 simulated scene episodes, with a learning rate of 0.001 and a duration of about five hours.

Block 1206 is a reinforcement learning tuning stage. As in block 1204, block 1206 uses a well-known off-policy RL algorithm, such as Q-Learning or Double Q-Learning. In the example implementation, experience replay is used, with an experience replay buffer that stores the last 100,000 steps, and that may be updated from new simulations. The reinforcement learning tuning stage of block 1206 uses more complex and differentiated scenes and a lower learning rate than the main reinforcement learning stage of block 1204, to generate a more robust and stable artificial neural network.

The reinforcement learning tuning stage of the block 1206 uses a well-known SGD optimization technique and a well-known MSE loss function for training the artificial neural network. In the example implementation, it may be trained using 10000 simulated scene episodes, with a learning rate of 0.001 and a duration of about six hours.

Modifications and improvements to the above-described implementations of the present technology may become apparent to those skilled in the art. For example, although the prediction model is described as being used to generate scores based on dynamic objects, while the analytical model is described as being used to generate scores based on static objects, it will be understood that these boundaries may not be absolute. For example, an object that may normally be classified as a dynamic object may not be moving at the time that the robotic vehicle is operating in the vicinity. Examples of this are parked cars or people who are standing in a constant location, e.g., waiting for a bus. In this case, although these "objects" are static, in that they are not moving, they might still be handled by the prediction model.

The foregoing description is intended to be exemplary rather than limiting. The scope of the present technology is therefore intended to be limited solely by the scope of the appended claims.

What is claimed is:

1. A method for operating a robotic vehicle, the method comprising:
   receiving, on a computing device associated with the robotic vehicle, a sensor input from a sensor associated with the robotic vehicle, the sensor input providing information on dynamic objects and static objects in a vicinity of the robotic vehicle;

generating, using a prediction model on the computing device, a first plurality of scores, each score in the first plurality of scores associated with a possible action of the robotic vehicle from a first plurality of actions, the prediction model configured to generate the first plurality of scores based, at least in part, on a predicted probability of the robotic vehicle encountering any of the dynamic objects;

generating, using an analytical model on the computing device, a second plurality of scores, each score in the second plurality of scores associated with a possible action of the robotic vehicle from a second plurality of actions, the analytical model configured to generate the second plurality of scores based, at least in part, on the information on the static objects;

combining the first plurality of scores with the second plurality of scores to generate a plurality of combined scores;

selecting an action for the robotic vehicle based, at least in part, on the plurality of combined scores; and operating the robotic vehicle according to the selected action.

2. The method of claim 1, wherein the prediction model is configured to generate the first plurality of scores based, at least in part, on predicted actions of each of the dynamic objects.

3. The method of claim 1, wherein the analytical model is more accurate than the prediction model.

4. The method of claim 1, wherein combining the first plurality of scores with the second plurality of scores comprises giving more weight to the first plurality of scores than to the second plurality of scores, to avoid collisions with the dynamic objects.

5. The method of claim 1, wherein selecting the action for the robotic vehicle further comprises selecting the action based, at least in part, on a target destination for the robotic vehicle.

6. The method of claim 1, wherein each action of the first plurality of actions comprises an angular direction and a velocity for the robotic vehicle.

7. The method of claim 6, wherein the first plurality of scores is represented in a two-dimensional matrix, wherein a first dimension of the two-dimensional matrix represents the angular direction and a second dimension of the two-dimensional matrix represents the velocity.

8. The method of claim 1, wherein the prediction model comprises a pretrained neural network, and wherein generating the first plurality of scores comprises providing at least part of the information on the dynamic objects as input to the pretrained neural network.

9. The method of claim 1, wherein generating the second plurality of scores comprises penalizing actions that are obstructed by a static object.

10. A robotic vehicle comprising:
at least one sensor; and
a computing device including:
    a motion planning module configured to:
        receive a sensor input from the at least one sensor, the sensor input providing information on dynamic objects and static objects in a vicinity of the robotic vehicle;
        generate, using a prediction model, a first plurality of scores, each score in the first plurality of scores associated with a possible action of the robotic vehicle from a first plurality of actions, the prediction model configured to generate the first plurality of scores based, at least in part, on a predicted probability of the robotic vehicle encountering any of the dynamic objects;
        generate, using an analytical model, a second plurality of scores, each score in the second plurality of scores associated with a possible action of the robotic vehicle from a second plurality of actions, the analytical model configured to generate the second plurality of scores based, at least in part, on the information on the static objects;
        combine the first plurality of scores with the second plurality of scores to generate a plurality of combined scores; and
        select an action for the robotic vehicle based, at least in part, on the plurality of combined scores; and
    an operation module configured to cause the robotic vehicle to operate according to the selected action from the planning module.

11. The robotic vehicle of claim 10, wherein the prediction model is configured to generate the first plurality of scores based, at least in part, on predicted actions of each of the dynamic objects.

12. The robotic vehicle of claim 10, wherein the prediction model comprises a pretrained neural network.

13. The robotic vehicle of claim 12, wherein the motion planning module is configured to generate the first plurality of scores by providing at least part of the information on the dynamic objects as input to the pretrained neural network.

14. The robotic vehicle of claim 10, wherein the analytical model is more accurate than the prediction model.

15. The robotic vehicle of claim 10, wherein the motion planning module is configured to give more weight to the first plurality of scores than to the second plurality of scores when combining the first plurality of scores with the second plurality of scores, to avoid collisions with the dynamic objects.

16. The robotic vehicle of claim 10, wherein the motion planning module is configured to select the action based, at least in part, on a target destination for the robotic vehicle.

17. The robotic vehicle of claim 10, wherein each action of the first plurality of actions comprises an angular direction and a velocity for the robotic vehicle.

18. The robotic vehicle of claim 10, wherein the motion planning module is configured to generate scores in the second plurality of scores that penalize actions that are obstructed by a static object.

* * * * *